LIGHT-TO-FREQUENCY CONVERTER CIRCUIT

Filed Feb. 1, 1966

HOWARD E. MURPHY
LOUIS J. KABELL
INVENTOR.

BY Roger L. Browdy
Samuel Lindenberg
ATTORNEYS

United States Patent Office 3,334,309

Patented Aug. 1, 1967

3,334,309

LIGHT-TO-FREQUENCY CONVERTER CIRCUIT

Howard E. Murphy, Redwood City, and Louis J. Kabell, Palo Alto, Calif., assignors to Fairchild Camera and Instrument Corporation, Syosset, N.Y., a corporation of Delaware Filed Feb. 1, 1966, Ser. No. 524,153

6 Claims. (Cl. 331—66)

ABSTRACT OF THE DISCLOSURE

Apparatus for converting light into an electrical signal having a frequency representing the light intensity. The apparatus includes a comparator which generates an output signal when the input signal exceeds a predetermined threshold value, and a switch which charges a capacitor to a reference voltage when a signal is received indicating that the input signal has exceeded the predetermined threshold value. A photodiode is connected to the comparator for changing the reference signal toward the threshold value at a rate determined by the light intensity falling on the photodiode. The output signal frequency of the apparatus is representative of the light intensity.

This invention relates to apparatus for converting light to an electrical signal whose frequency varies with the intensity of light, and more particularly to improvements therein.

An object of this invention is the provision of a novel circuit arrangement for converting light to an electrical signal whose frequency is dependent upon the intensity of the light.

Yet another object of the present invention is the provision of a unique circuit arrangement for enabling the digitizing of light levels with an accuracy not hitherto achieved.

Still another object of the present invention is the provision of a novel solid state circuit which oscillates at a frequency which is linearly dependent upon the intensity of illumination detected by a photosensitive diode.

These and other objects of the invention are achieved in an arrangement wherein apparatus converts light received from a source to an electrical signal, the frequency of which represents the intensity of that light. This apparatus includes comparator means which provides an output signal when the amplitude of a signal applied to its input exceeds a predetermined threshold value. The output signal from the comparator is then applied to a circuit arrangement which establishes a voltage at the comparator input having a reference level, which is below the threshold value. Photodiode means are connected to the input of the comparator for changing the level of the reference voltage toward the threshold at the rate determined by the intensity of the illumination falling on the photodiode whereby the comparator output signal frequency is representative of the intensity of the light.

More specifically, the level of the voltage stored on a capacitor is compared by a comparator circuit arrangement with a reference voltage, then the comparator circuit arrangement provides an output pulse which is used to cause a switch circuit to reestablish the level of the voltage on the capacitor to a reference value. The voltage of the capacitor is changed in a direction to trigger the comparator circuit when it exceeds the threshold level by a photodiode, which is connected to said capacitor. This photodiode is exposed to the illumination desired to be measured. The more intense the illumination, the higher the conductance of the photodiode, the more rapidly it will alter the capacitor voltage toward the threshold value which triggers the comparator circuitry. Accordingly, the circuit arrangement described produces an output which is an electrical signal whose frequency is representative of the intensity of the illumination caused to fall upon the photodiode.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
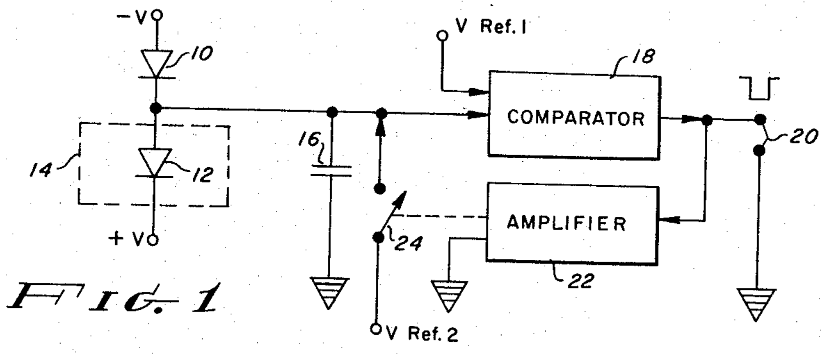
FIGURE 1 is a schematic representation of an embodiment of the invention.

Referring now to FIGURE 1, there may be seen a simplified schematic circuit diagram of an embodiment of this invention. Diodes 10 and 12 are a pair of photodiodes which are selected to have equal dark currents, and are mounted thermally close together to give a first order cancellation of temperature-caused dark current variations. Diode 12 is covered by an opaque container 14 (represented by dotted lines), while diode 10 is exposed to the illumination to be measured. Diode 10 has its cathode connected to the anode of diode 12. Diode 10 has its anode connected to a source of negative potential designated as —V and diode 12 has its cathode connected to a source of positive potential designated as +V. The junction of the diodes 10 and 12 is connected to one side of a capacitor 16 and to one input to a comparator 18. The other side of the capacitor 16 is grounded. A comparator is a circuit designed to compare a signal voltage with a reference voltage and produce either a digital "one" or a "zero" when one is higher than the other. It may be likened in many respects to the well-known Schmitt trigger circuit. A second input to the comparator 18 is a reference voltage designated as V Ref 1 on the diagram.

The output of the comparator is applied to output terminals 20 and also serves as the input to an amplifier 22. When the amplifier is actuated by an output from the comparator, it closes the switch 24 and recharges the capacitor to a second reference voltage level, V Ref 2.

Figure 2:
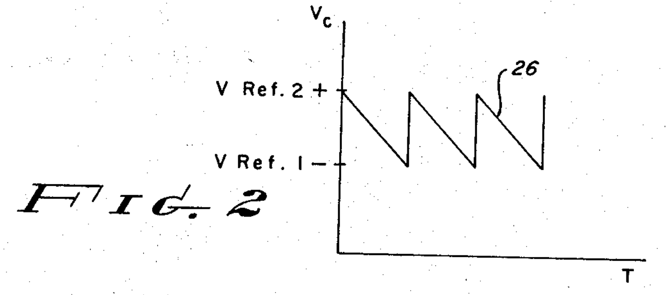
FIGURE 2 is a graph shown to assist in an understanding of the invention.

Consider now FIGURE 2 which shows a waveshape 26 representing the voltage across capacitor 16 over a time interval T. Assume that the amplifier 22 has just been actuated whereupon the switch has been closed and capacitor 16 is charged to its reference level V Ref 2 which, by way of example, is a positive voltage. The comparator 18 is constructed so that it will produce an output pulse when the voltage across the capacitor 16 becomes more negative than a predetermined negative reference value V Ref 1. The illumination applied to the photodiode 10 causes it to conduct current, the amplitude of which is determined in accordance with the intensity of the illumination. This current causes the capacitor 16 to charge in a negative going direction. When the potential across capacitor 16 has reached the negative level which is required to trigger the comparator, an output pulse is provided. This output pulse closes the switch 24 through amplifier 22 causing the capacitor to be recharged to its reference positive value again. The greater the intensity of the illumination applied to the diode 10, the heavier the current it conducts, the more rapidly the capacitor 16 is charged to the negative value required to trigger the comparator 18. It will therefore be seen from the foregoing explanation that the output signal of the structure shown in FIGURE 1 has a frequency which is a direct measure of the intensity of the illumination directed onto the photodiode 10.

Figure 3:
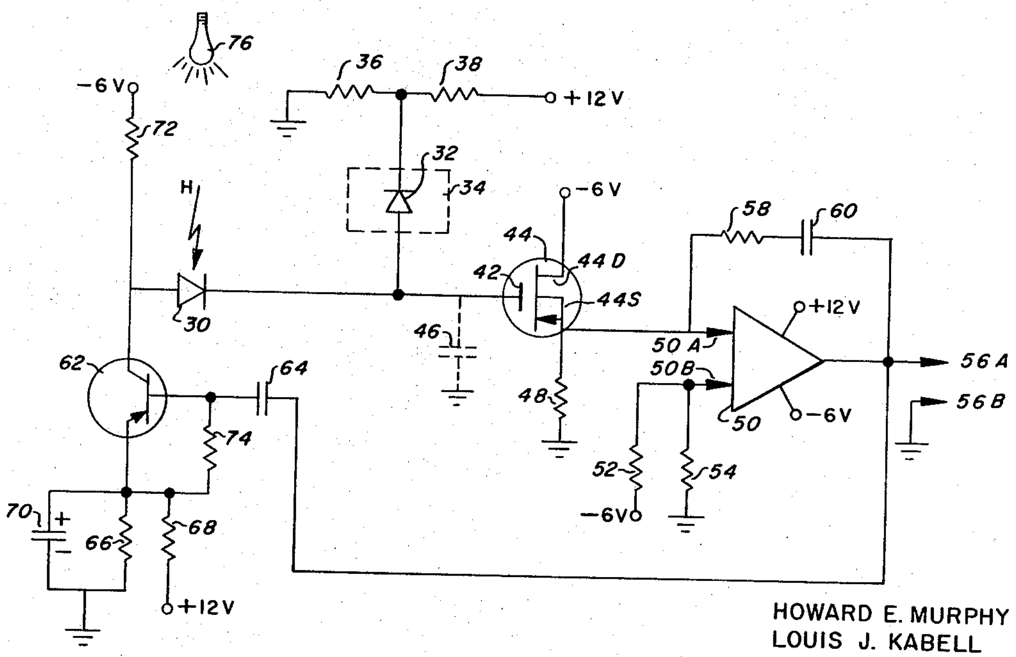
FIGURE 3 is a circuit diagram of a preferred embodiment of the invention.

Reference is now made to FIGURE 3 which is a circuit diagram of a preferred embodiment of the invention. Two photodiodes respectively 30, 32, which are preferably of the silicon planar type, and which are selected to have substantially equal dark currents are mounted thermally close together. The photodiode 32 is enclosed in an opaque housing 34, represented by the dotted line. The anode of photodiode 30 is connected through a resistor 72 to a negative potential source which may be on the order of 6 volts. The cathode of photodiode 30 is connected to the anode of the photodiode 32. The cathode of photodiode 32 is connected to a positive potential on the order of 6 volts provided by voltage divider resistors 36 and 38 connected between a +12 volt source and ground.

The junction of the photodiodes 30, 32 is connected to the gate electrode 42 of an enhancement mode metal-oxide-semiconductor field effect transistor 44, hereafter designated as a MOS transistor 44. A capacitor 46 exists between the gate electrode 42 and ground due to the junction capacitance of diodes 30, 32, the input capacitance of MOS transistor 44, and wiring capacitance. The drain electrode 44D of the MOS transistor is connected to a negative potential source, which may be on the order of —6 volts. The source electrode 44S of the MOS transistor is connected through a resistor 48 to ground. An enhancement mode MOS transistor becomes conductive only when the gate-to-source voltage becomes more negative than a certain threshold value. In this embodiment, this is a voltage which is negative with respective to ground. When the potential on the gate electrode exceeds this negative value, then the MOS transistor will conduct current from the drain to the source, behaving somewhat like a cathode follower circuit, whereby a negative going ramp voltage is applied to one input 50A of a differential comparator circuit 50. When this ramp voltage exceeds the threshold reference voltage applied to the other comparator input 50B, the comparator output begins to go negative. The threshold reference voltage at terminal 50B is established by connecting terminal 50B to the junction of series connected resistors 52, 54, which in turn are connected across a —6 volt potential supply. Positive feedback through a resistor 58 and a capacitor 60, which are connected from the comparator circuit output to input causes the circuit to become regenerative in the manner of a conventional one-shot multivibrator, so that the output pulse is negative and has a fixed duration. The negative pulse voltage output of the differential comparator comprises the output of the system, and is applied to one of a pair of output terminals 56A, the other of which 56B is connected to ground.

A transistor 62 serves as, and is analogous to, the switch and amplifier circuit shown in FIGURE 1 which recharges capacitor 46 to its reference level value. A capacitor 64 couples the output 56A of comparator 50 to the base of transistor 62. The emitter of transistor 62 is connected to a reference potential established at the junction of serially connected resistors 66, 68, connected between a +12 volt potential source and ground. A capacitor 70 is connected across resistor 66. The collector of this transistor is connected to the anode of photodiode 30 and through a resistor 72 is connected to a source of negative potential, which may be on the order of —6 volts. Transistor 62 is normally maintained nonconductive by the voltage applied through resistor 74 connected between the emitter and base of transistor 62. When transistor 62 is nonconductive, diode 30 is in its reverse biased operating condition. A negative output pulse from comparator 50, coupled through capacitor 64, causes transistor 62 to conduct heavily, forward biasing photodiode 30, and recharging capacitor 46 to very nearly the reference potential on the emitter of transistor 62.

In order to understand the operation of the circuitry shown in FIGURE 3, assume that the transistor 62 has just charged capacitor 46 through diode 30 to its most positive value. In an embodiment of the invention which was built, this was on the order of +2 volts. Light from a source 76 is directed to shine upon the photodiode 30, enabling it to conduct current whereby the voltage across capacitor 46 commences to change in a negative going direction. The speed at which this change occurs depends upon the intensity of the illumination shining upon the diode 30. As soon as the value of the voltage across capacitor 46 attains the threshold voltage value necessary to render the MOS transistor conductive (in an embodiment of the invention which was built, this was about —3 volts), a negative going output signal appears across the resistor 48 which is applied to the comparator input 50A. The differential comparator provides an output at the output terminals 56A, 56B. The transistor 62 is rendered conductive by this output pulse whereby a positive going pulse is applied to the anode of photodiode 30 to charge capacitor 46 back to its positive reference level. This cuts off the output of the MOS transistor.

The rapidity with which the MOS transistor is rendered conductive again depends upon the intensity of the illumination falling upon the photodiode 30. The greater the intensity of this illumination, the shorter the interval between nonconduction and conduction of the MOS transistor, and thus the higher the frequency of the output signal. The lower the illumination which is applied to the photodiode 30, the lower the frequency of the output signal of the system.

By way of illustration and not to serve as a limitation upon the invention, the values of the components which were employed in an operative embodiment of the invention are as follows:

| | | Values |
|---|---|---|
| Capacitor: | | |
| **60** | pf | 5000 |
| **64** | μf | .02 |
| **70** | μf | 10 |
| Resistor: | | |
| **36** | ohms | 5.1K |
| **38** | do | 5.1K |
| **48** | do | 1K |
| **52** | do | 62K |
| **54** | do | 1K |
| **58** | do | 20K |
| **66** | do | 390 |
| **68** | do | 750 |
| **72** | do | 1K |
| **74** | do | 5.1K |

The gate to source threshold voltage (V*g*ST) of the MOS field effect transistor was on the order of —3 volts. Transistor 62 is a Fairchild 0019 PNP transistor. The capacitor 46 has its value selected in accordance with the frequency range desired. That is, the value of the capacitor 46 may be varied by connecting in actual capacitors at its location or by the kinds of components selected, to obtain a desired frequency range. With a proper choice of this capacitor value, the circuit sensitivity may be made equal to one cycle per second, per foot candle, for example. The duration of the negative pulse output of the differential comparator need only be long enough to restore the initial charge on capacitor 46, which in an embodiment of the invention was less than 0.1 microsecond. The differential comparator 50 employed was a Fairchild *u* A 710.

The basic circuit arrangement shown and described herein has utility in many systems requiring accurate measurement of illumination. For example, a digital readout light meter is provided by counting the number of pulses provided by the comparator over a fixed interval using conventional frequency counting techniques.

A precise film exposure may be obtained in a system utilizing the inherent integration feature of the circuit.

The frequency of the pulses from the comparator may be compared with the frequency of oscillations from a source whose frequency is calibrated to light intensity to derive a control signal for controlling the intensity of the illuminating light source.

There has accordingly been described and shown hereinabove a novel, useful and unique circuit arrangement for converting the intensity of light into an electrical signal whose frequency varies in accordance with the intensity of that light. This electrical signal may be easily converted into a digital representation either indicating the intensity of the light or, if measured over a period of time can digitally indicate the total amount of light received by the measuring photodiode.

What is claimed is:

1. Apparatus for converting light received from a source of light to an electrical signal, the frequency of which is representative of the intensity of said light comprising comparator means for providing an output signal when the amplitude of a signal applied to its input exceeds a predetermined threshold value, switching means responsive to an output signal from said comparator means for applying a reference signal at said comparator means input having a reference level upon said amplitude exceeding said threshold value, and photodiode means connected to said comparator means input for changing said reference signal toward said threshold value at a rate determined by the illumination intensity falling on said photodiode whereby said comparator output signal frequency is representative of the intensity of said light.

2. Apparatus for producing a signal having a frequency representative of the intensity of light received from a source of light comprising comparator means for producing an output signal when a signal is applied to its input exceeding a predetermined threshold level, capacitor means connected across the input of said comparator means, switching means coupled to the output of said comparator means and to said capacitor means for charging said capacitor means to a reference voltage level in response to an output from said comparator means indicating that said input signal has exceeded said predetermined threshold level, and photodiode means connected to said capacitor means for charging said capacitor means to a voltage level which exceeds said comparator means threshold responsive to light from said source, at a rate determined by the intensity of the light from said source whereby the frequency of the output of said comparator represents the intensity of said source of light.

3. Apparatus as recited in claim 2 wherein said photodiode means comprises two substantially identical photodiodes connected with their outputs in opposition, and an opaque container enclosing one of said photodiodes.

4. Apparatus as recited in claim 2 wherein said comparator means comprises a metal-oxide-semiconductor transistor of the type having gate, source and drain electrodes, said gate electrode being connected to said photodiode means, a resistor having one end connected to said source electrode, and means for applying operating potential between said drain electrode and the other end of said resistor.

5. Apparatus as recited in claim 2 wherein said means for charging said capacitor means to a reference voltage level in response to an output from said comparator means comprises a transistor having collector, emitter and base electrodes, means coupling said base electrode to the output of said comparator means, means for applying operating potential to said emitter and collector electrodes, and means coupling said collector electrode to said capacitor means.

6. Apparatus for producing a signal having a frequency representative of the intensity of light received from a source of light comprising comparator means for producing an output signal when a signal is applied to its input exceeding a predetermined threshold, said comparator means comprising a metal-oxide-semiconductor field effect transistor including a gate electrode, a source electrode and a drain electrode, a first resistor having one end connected to said source electrode, a first source of operating potential connected between said drain electrode and said first resistor other end, and differential comparator means connected to said source electrode for producing an output signal responsive to an output received from said source electrode; a transistor having base, emitter and collector electrodes; a second source of operating potential for said transistor; means connecting said second source of operating potential to said emitter and collector electrodes, means for biasing said transistor to be nonconductive in the absence of an input applied to its base electrode; means connecting said transistor base to said differential comparator means to render said transistor conductive responsive to an output signal from said differential comparator means; first and second photodiode means; means coupling said first photodiode means between said transistor collector electrode and said gate electrode, with a polarity to prevent current flow therebetween when said first photodiode means is not illuminated; an opaque container enclosing said second photodiode means; a source of biasing potential, and means connecting said second photodiode means between said source of biasing potential and said gate electrode for producing an electrical current for cancelling any dark electrical current produced by said first diode means, whereby conduction of said transistor results in the charging to a reference voltage level of an electrode and wiring capacitance established at said gate electrode, illumination of said first diode from said source of light causes said capacitance to charge until it exceeds the threshold of said comparator means, and the frequency of the output signal of said comparator means is indicative of the intensity of the light.

References Cited

UNITED STATES PATENTS 3,287,975 11/1966 Mason et al. ------- 331—66 X

OTHER REFERENCES

Hasler et al. "May to Measure Light Intensity at a Distance," Electronics July 17, 1959, pages 48, 49, 331–66.

ROY LAKE, *Primary Examiner.*

S. H. GRIMM, *Assistant Examiner.*